United States Patent
Falta

(10) Patent No.: US 11,072,351 B2
(45) Date of Patent: Jul. 27, 2021

(54) DEVICE FOR MONITORING OPERATION PARAMETERS OF A VEHICLE AXLE

(71) Applicant: LEVEL S.R.O., Nachod (CZ)

(72) Inventor: Michal Falta, Nachod (CZ)

(73) Assignee: LEVEL S.R.O., Nachod (CZ)

( * ) Notice: Subject to any disclaimer, the term of this patent is extended or adjusted under 35 U.S.C. 154(b) by 0 days.

(21) Appl. No.: 16/483,814

(22) PCT Filed: Feb. 5, 2018

(86) PCT No.: PCT/CZ2018/000007
§ 371 (c)(1),
(2) Date: Aug. 6, 2019

(87) PCT Pub. No.: WO2018/141315
PCT Pub. Date: Aug. 9, 2018

(65) Prior Publication Data
US 2020/0023868 A1 Jan. 23, 2020

(30) Foreign Application Priority Data
Feb. 6, 2017 (CZ) .................................. PV2017-68

(51) Int. Cl.
*B61D 43/00* (2006.01)
*B61K 9/04* (2006.01)
(Continued)

(52) U.S. Cl.
CPC ................ *B61D 43/00* (2013.01); *B61K 9/04* (2013.01); *B61L 15/0027* (2013.01);
(Continued)

(58) Field of Classification Search
CPC ....... B61D 43/00; B61K 9/04; B61L 15/0027; B61L 27/0094; B61L 27/0077;
(Continued)

(56) References Cited

U.S. PATENT DOCUMENTS 5,072,821 A * 12/1991 Kruse .................... F16C 33/04
198/327
8,341,289 B2 * 12/2012 Hellhake ........... H04L 29/12283
709/238
(Continued)

FOREIGN PATENT DOCUMENTS

DE 2507645 9/1976
GB 2254154 A 9/1992
(Continued)

OTHER PUBLICATIONS

PCT Search Report and Written Opinion prepared for PCT/CZ2018/000007, completed May 25, 2018.

*Primary Examiner* — Brian Wilson
(74) *Attorney, Agent, or Firm* — Barnes & Thornburg LLP

(57) ABSTRACT

A device for monitoring operation parameters of a vehicle axle including a measuring instrument (1) comprising at least a position sensor, a device (2) for communication of measured quantities to an external device, a mechanism (5) for conversion of mechanical energy of the axle to electrical energy and a memory (3) with a stored identification code. A device has the shape of a ring (4) that is applied on the vehicle axle in such a way that it encircles it. The ring (4) consists of at least two parts (4a, 4b) that are adapted for permanent connection around the vehicle axle. The mechanism (5) consists of a circumferential cavity (5a) in the inner part of the ring where a permanent magnet (5b) is freely positioned, at least one coil (5c), preferably four coils (5c) being positioned along its perimeter. The device (2) for communication of measured quantities is a wireless transmitter with a GSM interface or radio-frequency interface (Continued)

configured for communication of measured values together with the identification code (3) of the axle to an external processing unit.

20 Claims, 2 Drawing Sheets

(51) Int. Cl.
　　*B61L 15/00*　　　(2006.01)
　　*B61L 27/00*　　　(2006.01)
　　*F16C 19/52*　　　(2006.01)
(52) U.S. Cl.
　　CPC ....... *B61L 27/0077* (2013.01); *B61L 27/0094* (2013.01); *F16C 19/527* (2013.01); *F16C 2326/10* (2013.01)
(58) Field of Classification Search
　　CPC .............. B61L 25/025; B61L 15/0081; B61L 2205/00; B61L 27/0083; B61L 15/0054; F16C 2326/10; F16C 19/527; H02K 7/1846; H02K 7/18; H02K 21/26; Y02T 30/00

USPC ............................................................ 290/3
See application file for complete search history.

(56) References Cited

U.S. PATENT DOCUMENTS

| | | | |
|---|---|---|---|
| 2005/0151375 A1 | 7/2005 | Cheung et al. | |
| 2007/0208841 A1* | 9/2007 | Barone | B61L 15/0036 709/223 |
| 2008/0011531 A1* | 1/2008 | Cole | H02K 21/16 180/65.51 |
| 2008/0018110 A1 | 1/2008 | Roth | |
| 2009/0256443 A1 | 10/2009 | Turner | |
| 2012/0049524 A1* | 3/2012 | Nikolic | B60L 53/00 290/50 |
| 2015/0237659 A1* | 8/2015 | Schena | B60L 50/15 370/329 |

FOREIGN PATENT DOCUMENTS

WO　WO2009/109200　　9/2009
WO　WO2017/184366　　10/2017

* cited by examiner

DEVICE FOR MONITORING OPERATION PARAMETERS OF A VEHICLE AXLE

CROSS-REFERENCE TO RELATED APPLICATIONS

This application is the U.S. national phase of PCT/CZ2018/000007, filed on Feb. 5, 2018, which claims the benefit of Czech Republic Patent Application Serial Number PV2017-68, filed on Feb. 6, 2017, the entire disclosures of both of which are incorporated herein by reference.

FIELD OF THE INVENTION

The invention relates to an electronic device for monitoring of operation parameters of an axle of an (unpowered) vehicle, especially an axle of a railway wagon or a bicycle, or possibly its cargo and accessories, comprising especially position determination, measuring of quantities indicating the condition of the axle, rotational speed and communication of these data to an external collection device for further processing.

BACKGROUND INFORMATION

In railway operation, the condition of pulled wagons, especially the condition of wagon axles needs to be checked. Certain operation quantities are measured as the rotational speed, temperature, axle vibration level and possibly the position of the wagon by means of GPS. These data can be used to calculate derived quantities as the speed, covered distance as well as information about blocking of the axle and warning messages. Possibly, certain operation data concerning the cargo, e.g. opening, overloading, temperature of the cargo compartment etc. can be collected.

A specific feature of railway wagons is that each wagon in a particular train set may be intended for a different destination and wagons are added to different sets during transport; therefore, having the possibility of monitoring their current movement and technical condition is important. Another specific feature is that they are not connected to the power supply, and therefore the required quantities cannot be measured conventionally.

At present, some of the measured quantities can be monitored by means of battery-supplied devices that are glued or magnetically attached onto a side wall of the wagon or applied from the bottom into the wagon structure. A disadvantage of these devices is the possibility of the device getting damaged or stolen, but especially the required care of a sufficient amount of power in their batteries. Regular recharging or replacement of batteries makes the operation of such devices very expensive and makes their use on a mass scale impossible. If these devices are operated in a very economical energy mode to extend the battery life, the monitored quantities cannot be measured as frequently as desired. Since the devices are removable, proper identification of the wagon or its accessories, as e.g. axles, is not guaranteed.

Other devices providing wagon operation information are devices attachable to wagon wheels that use the kinetic energy of the wheel for their operation. The document EP2323886 of the company PJMesstechnik discloses a device used to establish the position of the wagon attached to a wagon wheel using the rotational energy of the wheel.

The company PERPETUUM LTD supplies to the market measuring devices attachable to wagon wheels that use the vibrating energy of the wheel. The document GB2486008 discloses a monitoring system using two sources of energy: the ambient energy and radio-frequency energy. In these cases, the generated energy is not likely to be sufficient.

A disadvantage of such devices is the possibility of easy damage or theft and their purchasing price. These known devices are characterized by complicated installation and cannot be flexibly used for different types of wagons.

SUMMARY OF THE INVENTION

The above-mentioned drawbacks are solved by a device for monitoring operation parameters of a vehicle axle in accordance with the invention that uses power obtained from turning of the axle for its operation, the vehicle being a railway wagon or a bicycle.

The device for monitoring operation parameters of a vehicle axle includes measuring instruments comprising at least a GNSS geographic position sensor (i.e. position determination using a satellite system as GPS, Glonass, Galileo etc.), a device for communication of the measured quantities to an external system, a mechanism converting mechanical energy to electrical energy and a memory with a stored identification code. This device has the shape of a ring consisting of at least two parts that are adapted for fixed connection around an axle of the vehicle.

The ring consists e.g. of two halves that are joined on being attached to the axle. The connection is generally non-dismountable. The encircling around the axle protects the device from the risk of being detached from the vehicle axle, which is considerably high in case of a different attachment method.

The mechanism used to convert the rotational energy of the axle to electrical energy consists of a circumferential cavity in the inner part of the ring where a slider is freely positioned and at the perimeter of which at least one coil, preferably four coils, are positioned. The conversion of the rotational energy to electrical energy is based on movement of the slider in the ring cavity and electrical energy induction during passage of the slider past the induction coils distributed along the perimeter of the cavity. During turning of the wagon axle, the ring with the induction coils rotates simultaneously, the slider moving inside the cavity, being permanently situated at the bottom of the ring by virtue of gravity. This relative movement of the slider with respect to the coils results in induction and generation of electricity. This induced electrical energy is used for the power supply of the measuring instruments and data communication devices or if there is an excess, it can be used to recharge the battery.

The measuring device may further comprise some of the measuring instruments: rotary speed meter, thermometer, measuring device of the axle vibration level. The measuring device may also comprise a RF receiver to receive radio-frequency signals from sensors installed outside the device. If the device is mounted on a wagon axle, these may be RF sensors fitted in various places of the wagon or cargo.

The device for communication of measured quantities can be a wireless transmitter with a GSM interface or a radio-frequency interface for transmission of measured data (e.g. Sigfox, data transmission via satellites) configured for communication of measured quantities together with the identification code of the axle to an external processing unit (e.g. a server, PC or mobile phone), where these data are processed and assigned to axles of individual vehicles based on the identification. If the device is used on a wagon axis, they are assigned to particular wagons or wagon wheel sets for the purpose of determining their position and operation parameters of the axle, rotational speed, temperature, axle vibration level. If the device is used on a bicycle, the bicycle position, covered distance, achieved speed etc. can be transmitted.

The memory can be further adapted to store measured data.

The device for monitoring operation parameters of a vehicle axle further preferably comprises a control unit for the control of at least one measuring instrument and/or data communication device. The control unit can consist of a microprocessor equipped with a programmable timer to start individual measuring and communication operations at preset intervals.

If the device is installed on a wagon axle, the measured values can be used e.g. to determine blocking of an axis, the exact covered distance, a stimulus to issue a warning message in case a vibration or axle temperature limit is exceeded. An advantage of situating the device on a wagon axle is mainly the fact that the circular enclosing around the axis provides safe protection from theft and damage which is otherwise high if a different attachment method is used. At the same time, positioning on a wagon axle provides a sufficiently good GNSS signal for position determination and GSM interface for data transmission. Another advantage of having the device on a wagon axle is flexibility of its use for different axle diameters because the axle diameters can be easily adapted to the ring diameter with the use of inserted annuli. This enables versatile use with different types of wagons or even locomotives. With respect to a relatively low price of the device it is likely and very efficient that each axis of a railway wagon will be equipped with this device and not only one.

If the device is situated on a bicycle axle, the measuring device can further comprise an RF receiver to receive radio-frequency signals of a RF transmitter kept by the owner.

OVERVIEW OF FIGURES IN THE DRAWINGS

The principle of the invention is further clarified with reference to drawings where:

EXAMPLES OF EMBODIMENTS OF THE INVENTION

Example 1

Figure 1:
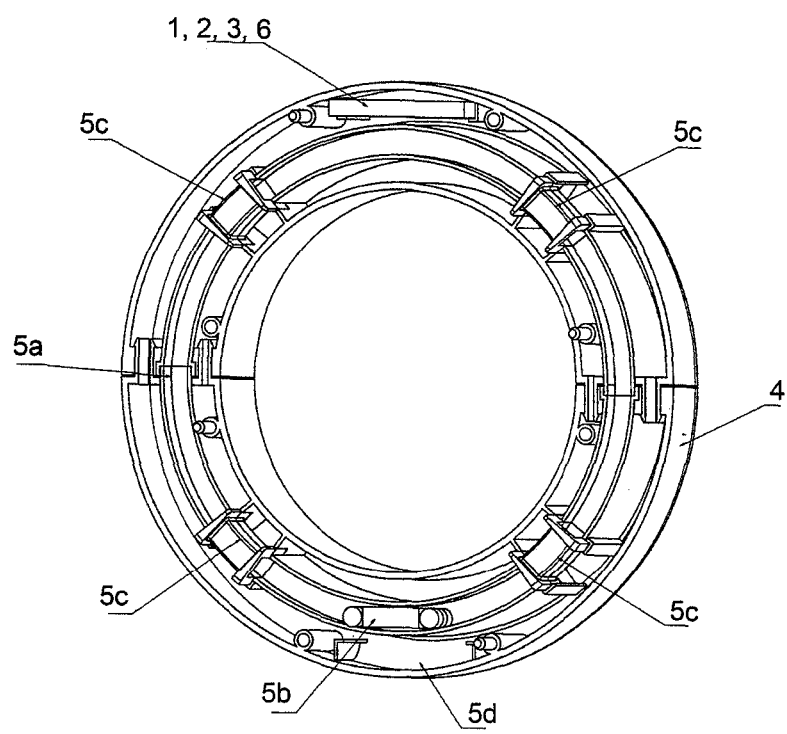
FIG. 1 shows a central (transversal) cross-section through a device in accordance with the invention on a plane perpendicular to the axle.
Figure 2A:
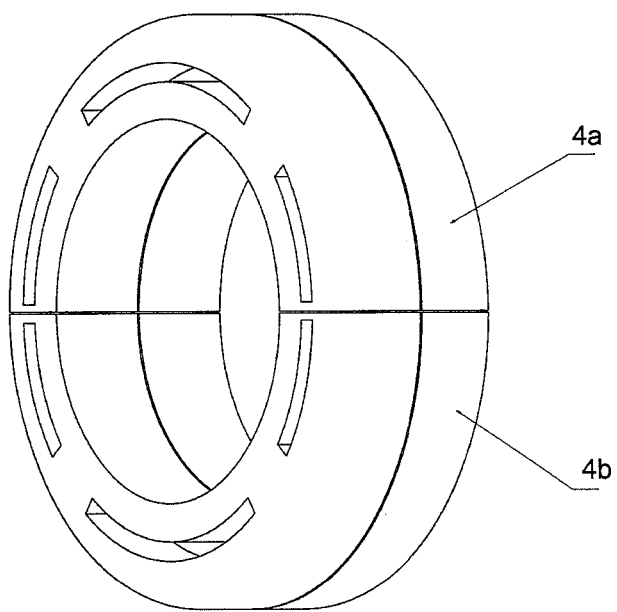
FIG. 2a shows a front view of a device in accordance with the invention, forming a ring.
Figure 2B:
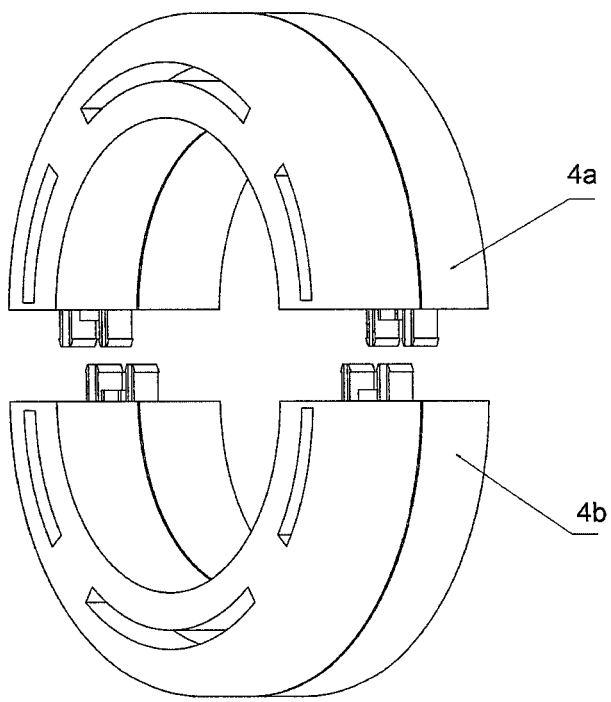
FIG. 2b shows two parts of a device in accordance with the invention in the dismounted form.

The device for monitoring operation parameters of a wagon axle has the shape of a ring 4 consisting of two halves 4a, 4b that are adapted to be connected together around the wagon axle. The ring is made of polyamide PA6/30 (nylon) filled with 30% of glass fiber to increase strength, hardness and thermal resistance. The cable interconnecting the coils is placed in one of the halves 4a, 4b before the installation and before the connection it is pulled into the other half. On installation on the axle, the halves 4a, 4b of the ring are joined by snapping and bonding. Then, the ring 4 cannot be removed from the axle without being damaged.

The device is equipped with a mechanism 5 for conversion of the axle rotational energy consisting of a circumferential cavity 5a in the inner part of the ring where a permanent magnet 5b is freely positioned, four coils 5c being distributed along its perimeter. The ring 4 with the induction coils 5c rotates simultaneously with the rotation of the wagon axle, the magnet 5b moving inside the cavity 5a being permanently situated at the bottom of the ring by virtue of gravity. This relative movement of the magnet 5b with respect to the coils 5c results in induction and generation of electricity. This induced electrical energy is used for the power supply of the measuring instruments 1 and data communication device 2 or if there is an excess, to recharge the battery 5d situated inside the ring 4 at its outer perimeter.

The device comprises a measuring instrument 1 equipped with a GNSS geographic position sensor, which is a GPS sensor in this case, a rotational speed sensor, a vibration sensor, a contact thermometer.

The device further comprises a device 2 for communication of measured quantities and a memory 3 with the stored identification code of the device. The communication device 2 is a wireless transmitter with a GSM interface or another radio-frequency interface for transmission of measured data (e.g. Sigfox, data transmission via satellites) configured for communication of measured quantities together with the identification to an external processing unit (server, PC etc.), where these data are processed and assigned to individual wagons and their axles registered in a superior system based on the identification.

The device for monitoring operation parameters of a wagon axle further comprises a control unit 6 for the control of at least one measuring instrument and/or data communication device. The control unit consists of a microprocessor equipped with a programmable timer to start individual measuring and communication operations at preset intervals.

The measured data can be used to determine the covered distance (based on the number of revolutions of the axle) and blocking of the axis e.g. due to a brake failure (in case of a change of the position established with the use of GNSS when there is no axle rotation). An elevated temperature and excessive vibrations can further indicate an incorrect function of axle bearings and lead to the issue of a warning message to prevent an accident.

This device can be used on any wagon axis; an annulus can be used to adapt the diameter of the axle.

Example 2

The device for monitoring operation parameters of a wagon axle having the shape of a ring 4 consists of two halves 4a, 4b that are adapted to be connected together around the wagon axle. The ring is made of polyethylene with an addition of glass with the weight ratio of 70:30, or of plastic, a composite material or an aluminum casting can be used.

The device is, similarly to Example 1, equipped with a mechanism 5 for conversion of the axle rotational energy consisting of a circumferential cavity 5a in the inner part of the ring where a permanent magnet 5b is freely positioned, four coils 5c being distributed along its perimeter. Induced electrical energy is used for the power supply of the measuring instruments 1 and data communication device 2 or if there is an excess, to recharge the battery 5d situated inside the ring.

The device comprises a measuring instrument 1 comprising a GNSS sensor, a rotational speed sensor, a vibration sensor, a contact thermometer. The measuring instrument further comprises a RF receiver to receive radio-frequency signals from sensors installed in various locations of the wagon or cargo. These sensors comprise RF sensors of:

temperature, pressure, illumination, level, cargo compartment opening, tilt, number of rotations, overloading and cargo identification. These sensors are powered by their own battery and periodically transmit values to the RF receiver.

The RF temperature sensor measures the ambient temperature e.g. inside the cargo space or on the wagon axle. The RF pressure sensor measures the ambient pressure e.g. inside a transported cistern or pressure in the brake system of the wagon. The RF illumination sensor measures the illumination level e.g. inside the cargo compartment of the wagon. The value of illumination may be important for the transported material or a change of the illumination value may be important for indication when the cargo space was opened. The RF level sensor based on the capacitance principle (or possibly on the resistance or pressure principle) measures the liquid level mostly in a cistern. The RF tilt sensor is a three-axis accelerometer measuring overloading on three axes in relation to the earth axis, which is used to obtain data about tilt changes and the number of rotations. The RF overloading sensors continuously measure the acceleration value on all the three axes and if the set allowed value is exceeded, it sends information to the RF receiver. The RF sensor for cargo identification sends its identification in regular intervals. It is used with more expensive cargoes in such a way that the sensor is placed within the entire cargo (e.g. in the transported machine or car).

The device for monitoring operation parameters comprises a control unit 6 for the control of the operation of the measuring instruments and/or data communication device. The control unit consists of a microprocessor and is equipped with a timer.

The device further comprises a device 2 for communication of measured quantities and a memory 3 with stored identification. The communication device 2 is a wireless transmitter with a GSM interface configured for communication of data together with identification 3 to an external processing unit (server, PC, mobile etc.), where these data are processed and based on the identification they are assigned to individual wagons and their axes.

Example 3

The device for monitoring operation parameters of a bicycle axle consists of two halves (4a, 4b) of a ring that are adapted to be connected together around the bicycle wheel axle. The ring is made of polyethylene with an addition of glass in the weight ratio of 70:30.

The device is, similarly to Examples 1 and 2, equipped with a mechanism 5 for conversion of the axle rotational energy consisting of a circumferential cavity 5a in the inner part of the ring where a permanent magnet 5b is freely positioned, four coils 5c being distributed along its perimeter.

Induced electrical energy is used for the power supply of the measuring instruments 1 and data communication device 2 or if there is an excess, to recharge the battery 5d situated inside the ring.

The measuring instrument 1 comprises a GPS sensor, a rotational speed sensor, a three-axis overloading sensor, an RG proximity sensor (receiver) and a control unit 6. The measuring instrument 1 provides a record of the covered route, speed, altitude and transmits them to an external unit (e.g. a mobile phone).

The GPS sensor is adapted to establish and send the position even though the wheel is not rotating, a battery serving as the source of energy for this measurement. This measurement can be used to find the bicycle after a theft or to trace bicycles for bicycle rent shops.

The RF proximity sensor comprises a RF receiver paired with a RF transmitter kept by the bicycle owner. The RF transmitter is equipped with identification and a battery. In regular intervals (e.g. 1x every second), the RF transmitter sends its identification number, which is received by the RF sensor (receiver) mounted on the bicycle. If a certain RF distance, e.g. 5 m, is exceeded, the receiver will not receive identification of the transmitter and the device will pass into the active guarding state. If during this period the overloading sensor is activated due to a motion of the bicycle, the control unit will evaluate handling of the bicycle as unauthorized and send alarm messages.

The owner's mobile phone can also be used as the RF transmitter. If the device recognizes a paired phone with Bluetooth on within its range (using the common RF principle just as e.g. a headset is paired to a mobile phone via Bluetooth), the device would not be in the active guarding state. As soon as the device loses the Bluetooth connection with the phone, it will pass into the active guarding state.

INDUSTRIAL UTILIZATION

The device for monitoring operation parameters of a vehicle axle can especially be used for railway wagons to measure the geographic position and other operation parameters as the rotational speed of the axle, axle temperature and axle vibrations. The device can be used flexibly for different types of railway wagons as well as to monitor parameters of the wagon cargo and wagon accessories. The device for monitoring operation parameters of a vehicle axle can be used for bicycles to check parameters of the covered route and to protect the bicycle from theft.

The invention claimed is:

1. A device for monitoring operation parameters of a wagon axle comprising i) a measuring instrument comprising at least a position sensor, ii) a communication device for communication of measured quantities to an external processing unit, iii) a mechanism for conversion of mechanical energy of the axle to electric energy, configured to supply the measuring instrument and the communication device with the electric energy, and iv) a memory with a stored identification code of the axle,
    wherein the device further comprises at least two parts that, when combined, form a ring that encircles the axle,
    wherein the mechanism comprises a) a circumferential cavity of the ring, wherein a permanent magnet is freely positioned in the circumferential cavity, the circumferential cavity being spaced apart from the axle, and b) at least one coil is positioned along a perimeter of the circumferential cavity and,
    wherein the communication device is a wireless transmitter configured for communication of the measured quantities together with the stored identification code of the axle to the external processing unit.

2. The device according to claim 1, wherein four coils are positioned along the perimeter of the circumferential cavity.

3. The device according to claim 1, wherein the mechanism is connected to a recharging battery.

4. The device according to claim 1, wherein the measuring instrument comprises a GNSS position sensor and one or more measuring instruments selected from the group consisting of a rotational speed meter, a thermometer, and a vibration sensor.

5. The device according to claim 1, wherein the wireless transmitter comprises a GSM interface or a radio-frequency interface.

6. The device according to claim 1, wherein the device further comprises a control unit to control the measuring instrument, the communication device, or both.

7. The device according to claim 6, wherein the control unit comprises a microprocessor and a timer configured to start individual measuring and communication operations at one or more preset intervals.

8. The device according to claim 6, wherein the control unit consists of a microprocessor and a timer configured to start individual measuring and communication operations at one or more preset intervals.

9. The device according to claim 1, wherein the measuring instrument further comprises a RF receiver to receive radio-frequency signals from sensors installed in one or more locations of a wagon or cargo.

10. The device according to claim 1, wherein the at least two parts includes a first half and a second half, the first half and the second half each having a semi-circular shape.

11. The device according to claim 10, wherein the first half and the second half each include an outer shell, the outer shell of the first half and the outer shell of the second half have an identical inner cross section.

12. The device according to claim 11, wherein the first half and the second half when connected form the circumferential cavity through which the permanent magnet can continuously, freely travel while being held by gravity below the axle.

13. The device according to claim 10, wherein the first half and the second half are attached to one another by at least one of snapping and bonding.

14. The device according to claim 10, wherein the first half includes at least one snap on a circumferential end of the first half, and the at least one snap is configured to couple with the second half to retain the first half and the second half together around the axle.

15. The device according to claim 10, wherein the first half includes a first snap on a first circumferential end of the first half and a second snap on a second circumferential end of the first half, and the first snap and the second snap are configured to couple with the second half to retain the first half and the second half together around the axle.

16. A device comprising
a first part,
a second part coupled to the first part, the first part and the second part cooperate to form a ring that encircles an axle and rotates with the axle,
a measuring instrument comprising at least a position sensor, and
a communication device for communication of measured quantities to an external processing unit,
wherein the first part and the second part define a circumferential cavity, at least one coil is coupled to at least one of the first part and the second part for rotation therewith and positioned along a perimeter of the circumferential cavity, and a permanent magnet is freely positioned in the circumferential cavity and held by gravity below the axle so that when the first part and the second part are rotated by the axle, the at least one coil rotates relative to the permanent magnet to convert rotational energy of the first part and the second part into electrical energy to power the measuring instrument and the communication device.

17. The device according to claim 16, wherein the communication device is a wireless transmitter configured to communicate the measured quantities and a stored identification code of the axle to the external processing unit.

18. The device according to claim 16, wherein the first part is a first half and the second part is a second half, and the first half and the second half each have a semi-circular shape that is adapted to extend around the axle.

19. The device according to claim 16, wherein the measuring instrument comprises a GNSS position sensor and one or more measuring instruments selected from the group consisting of a rotational speed meter, a thermometer, and a vibration sensor.

20. The device according to claim 16, wherein the first part includes at least one snap on a circumferential end of the first part, and the at least one snap is configured to couple with the second part to retain the first part and the second part together around the axle.

* * * * *